United States Patent
Atsuta

(10) Patent No.: US 9,488,237 B2
(45) Date of Patent: Nov. 8, 2016

(54) VEHICLE DISC BRAKE CALIPER BODY

(71) Applicant: NISSIN KOGYO CO., LTD., Ueda, Nagano (JP)

(72) Inventor: Daiki Atsuta, Nagano (JP)

(73) Assignee: NISSIN KOGYO CO., LTD., Nagano (JP)

(*) Notice: Subject to any disclaimer, the term of this patent is extended or adjusted under 35 U.S.C. 154(b) by 0 days.

(21) Appl. No.: 14/622,021

(22) Filed: Feb. 13, 2015

(65) Prior Publication Data

US 2015/0233438 A1   Aug. 20, 2015

(30) Foreign Application Priority Data

Feb. 18, 2014   (JP) .................. 2014-028147

(51) Int. Cl.
| | |
|---|---|
| *F16D 65/00* | (2006.01) |
| *F16D 55/2265* | (2006.01) |
| *F16D 65/18* | (2006.01) |
| *F16D 121/04* | (2012.01) |

(52) U.S. Cl.
CPC ....... *F16D 65/0068* (2013.01); *F16D 55/2265* (2013.01); *F16D 65/18* (2013.01); *F16D 2121/04* (2013.01)

(58) Field of Classification Search
CPC . F16D 65/0068; F16D 65/18; F16D 55/2265
See application file for complete search history.

(56) References Cited

U.S. PATENT DOCUMENTS

| | | | | |
|---|---|---|---|---|
| 3,442,080 A | * | 5/1969 | Rockwell | B60T 11/203 |
| | | | | 188/152 |
| 3,530,493 A | * | 9/1970 | Hollnagel | F16D 55/227 |
| | | | | 188/106 F |
| 3,545,577 A | * | 12/1970 | Harrison | F16D 65/18 |
| | | | | 188/352 |
| 3,555,821 A | * | 1/1971 | Rockwell | B60T 11/203 |
| | | | | 60/549 |
| 3,734,248 A | * | 5/1973 | Fay | F16D 55/227 |
| | | | | 188/345 |
| 3,976,169 A | * | 8/1976 | Ogawa | B62L 1/00 |
| | | | | 188/73.39 |
| 4,024,932 A | * | 5/1977 | Fay | B60T 11/206 |
| | | | | 188/106 P |
| 4,042,077 A | * | 8/1977 | McCarthy | F16D 55/28 |
| | | | | 188/171 |

(Continued)

FOREIGN PATENT DOCUMENTS

| | | |
|---|---|---|
| JP | S50020178 | 3/1975 |
| JP | S50082477 | 7/1975 |

(Continued)

OTHER PUBLICATIONS

JP Office Action dated Feb. 2, 2016, for related JP Application No. 2014-028147, 6 pages.

*Primary Examiner* — Vishal Sahni
(74) *Attorney, Agent, or Firm* — Andrew M. Calderon; Roberts Mlotkowski Safran Cole & Calderon, P.C.

(57) ABSTRACT

One embodiment of the present invention provides a caliper body including an acting portion having a cylinder bore; a union boss portion having a union hole; and a bleeder boss portion having a bleeder hole. The union boss portion is formed at a central portion of a side surface of the acting portion in a circumferential direction of a disc brake rotor, the side surface being opposite to a side surface facing the disc brake rotor. The bleeder boss portion extends from an outer circumferential side of the bottom wall of the cylinder bore to the union boss portion. The union boss portion and the bleeder boss portion form a continuous projecting portion such that the union boss portion projects further outwards than the bleeder boss portion.

20 Claims, 5 Drawing Sheets

(56) References Cited

U.S. PATENT DOCUMENTS

| | | | | |
|---|---|---|---|---|
| 4,386,682 | A | * | 6/1983 | Woo ............... F16D 55/224 188/196 P |
| 4,433,757 | A | * | 2/1984 | Warwick ........... F16D 55/227 188/1.11 R |
| 4,509,619 | A | * | 4/1985 | Baynes ............ F16D 55/226 188/73.38 |
| 5,150,772 | A | * | 9/1992 | Pantale ............... B60T 8/26 188/195 |
| 7,337,881 | B1 | * | 3/2008 | Sherman, II ..... F16D 55/22655 188/72.4 |
| 2007/0163851 | A1 | * | 7/2007 | Alexander ......... F16D 55/22 188/264 F |
| 2010/0078269 | A1 | * | 4/2010 | Tokunaga ......... F16D 55/228 188/73.46 |
| 2010/0096223 | A1 | * | 4/2010 | Itsuaki ............ F16D 55/228 188/72.5 |
| 2011/0290600 | A1 | * | 12/2011 | Hiramori ......... F16D 55/227 188/106 P |

FOREIGN PATENT DOCUMENTS

| | | |
|---|---|---|
| JP | S58160633 | 9/1983 |
| JP | S6054850 | 4/1985 |
| JP | 2002242963 | 8/2002 |
| JP | 2004278730 | 10/2004 |
| JP | 2013011323 | 1/2013 |

* cited by examiner

VEHICLE DISC BRAKE CALIPER BODY

CROSS-REFERENCE TO RELATED APPLICATION(S)

This application claims priority from Japanese Patent Application No. 2014-028147 filed on Feb. 18, 2014, the entire contents of which are incorporated herein by reference.

FIELD

An embodiment described herein generally relates to a vehicle disc brake caliper body which is mounted on a vehicle such as a four-wheeled motor vehicle or a motorcycle and more particularly to a vehicle disc brake caliper body in which a union boss portion including a union hole and a bleeder boss portion including a bleeder hole are provided in an acting portion.

BACKGROUND

A caliper body in a vehicle disc brake may be formed by fabricating a molded piece through, for example, casting. The molded piece may have a union boss portion and a bleeder boss portion at an acting portion, and working may be performed to thereby fabricate it into a caliper body to have a cylinder bore which installs a piston, a union hole through which pressurized working fluid is introduced into a hydraulic chamber provided in a bottom portion of the cylinder bore and a bleeder hole through which air mixed in the working fluid is discharged are formed (for example, refer to JP-UM-S60-054850-A and JP-2013-011323-A).

In the caliper bodies of JP-UM-S60-054850-A and JP-2013-011323-A, when the diameter of the cylinder bore has been changed, the position of the bleeder boss portion also has to be changed. Therefore, caliper body molded pieces which are formed to be worked into those caliper bodies cannot be used to fabricate caliper bodies having different cylinder bores in diameter.

Because of this, a caliper body having a cylinder bore of a different diameter has to be fabricated by using a caliper body molded piece where a bleeder boss portion is provided appropriately according to the diameter of the cylinder bore to be opened, and because of this, the above-exemplified molded pieces lack the versatility.

SUMMARY

One object of the invention is to provide a vehicle disc brake caliper body which can make a caliper body molded piece versatile to thereby realize a reduction in production costs.

The present invention provides following inventive Aspects 1 to 4. Numerals etc. in the brackets indicate exemplary correspondence with the reference sings used in the embodiment.

1. A vehicle disc brake caliper body (5) including:
    an acting portion (5a) having a cylinder bore (5e, 5f) into which a piston (8a, 8b) is inserted;
    a union boss portion (5h) having a union hole (10) through which a pressurized hydraulic fluid is introduced into a hydraulic chamber (9, 9) provided between a bottom wall (5i, 5k) of the cylinder bore (5e, 5f) and the piston (8a, 8b); and
    a bleeder boss portion (5j) having a bleeder hole (13) through which air mixed in the hydraulic fluid is discharged,
    wherein the union boss portion (5h) is formed at a central portion of a side surface of the acting portion (5a) in a circumferential direction of a disc brake rotor (2), the side surface being opposite to a side surface facing the disc brake rotor (2),
    wherein the bleeder boss portion (5j) extends from an outer circumferential side of the bottom wall (5i) of the cylinder bore (5e) to the union boss portion (5h), and
    wherein the union boss portion (5h) and the bleeder boss portion (5j) form a continuous projecting portion (5n) such that the union boss portion (5h) projects further outwards than the bleeder boss portion (5j).
2. The vehicle disc brake caliper body (5) of Aspect 1,
    wherein, as the bleeder boss portion, two bleeder boss portions (5j, 5m) are provided individually at both end portions of the union boss portion (5h) in the circumferential direction of the disc brake rotor (2).
3. The vehicle disc brake caliper body (5) of Aspect 1,
    wherein the caliper body (5) is fabricated by working a molded piece.
4. The vehicle disc brake caliper body (5) of Aspect 3,
    wherein the molded piece is formed through casting.
5. The vehicle disc brake caliper body (5) of Aspect 4,
    wherein the union boss portion (5h) is formed by working a gate portion used in casting the molded piece.

According to the vehicle disc brake caliper body of the invention, the union boss portion is formed at the central portion of the side surface of the acting portion which lies opposite to the side surface facing the disc brake rotor and the bleeder boss portion is formed to extend from the outer circumferential side of the bottom wall of the cylinder bore to the union boss portion. Therefore, the bleeder bore can be formed in an appropriate position according to a diameter of a cylinder bore to be formed, whereby a caliper body having a cylinder bore of a different diameter can be formed by using the same caliper body molded piece. This can impart the versatility to the caliper body molded piece, thereby reducing production costs.

The union boss portion and the bleeder boss portion form a continuous projecting portion such that the union boss portion projects further outwards than the bleeder boss portion. Therefore, the interference of a hydraulic piping connected to the union hole with a bleeder screw installed in the bleeder hole can easily be avoided, thereby enhancing the degree of freedom in layout.

The bleeder boss portions are provided individually at the disc circumferential end portions of the union boss portion to change a position forming a bleeder bore. Therefore, it is possible to fabricate a caliper body which is mounted on a right-hand side of the vehicle body and a caliper body which is mounted on a left-hand side of the vehicle body with using caliper body molded pieces of one type, thereby reducing production costs.

The caliper body molded piece is formed through casting, and the union boss portion is formed by making use of a gate portion used in casting the caliper body molded piece, whereby the union boss portion can easily be formed.

DETAILED DESCRIPTION

Figure 1:
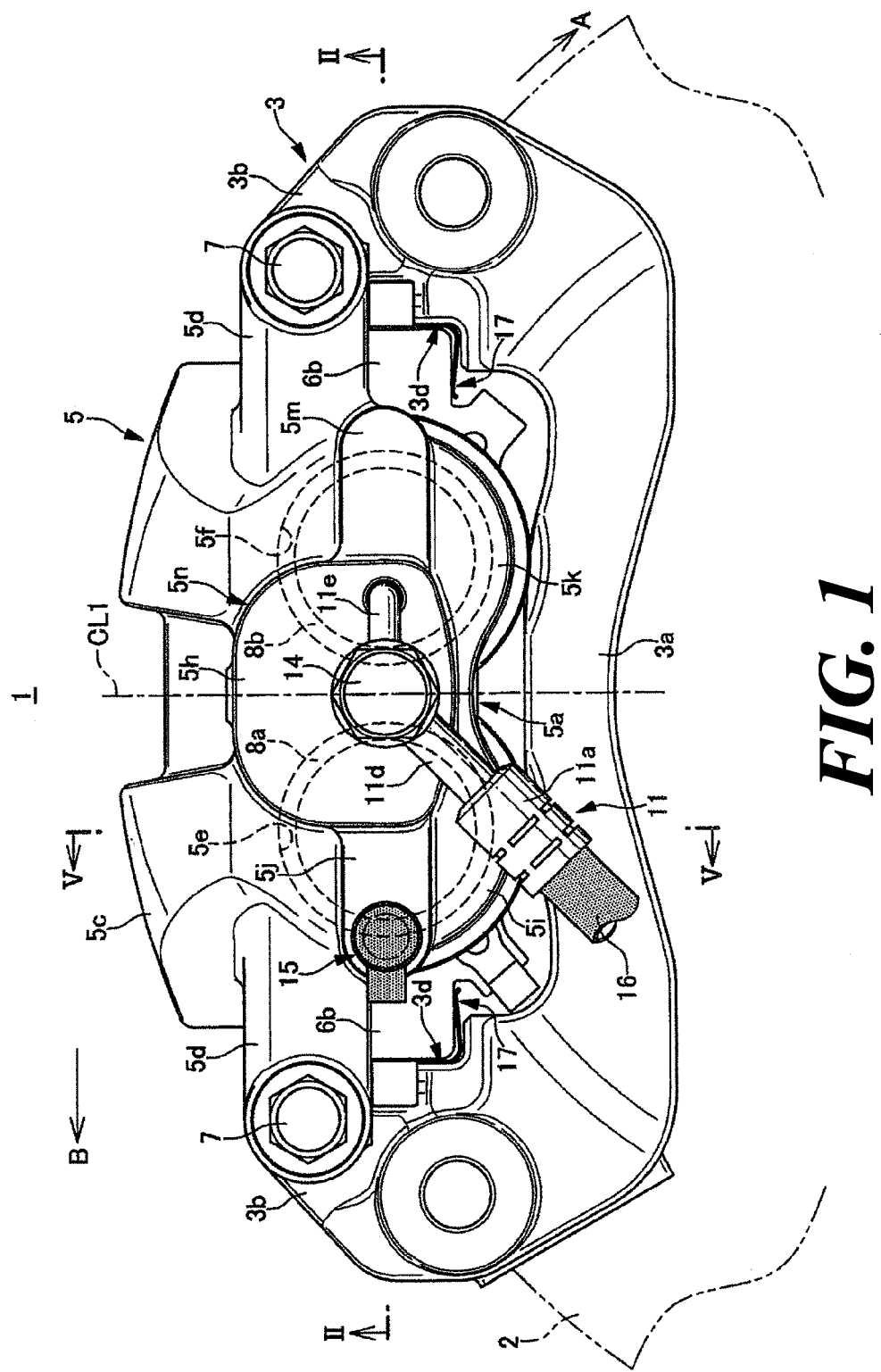
FIG. 1 is a front view of a vehicle disc brake showing an embodiment.
Figure 2:
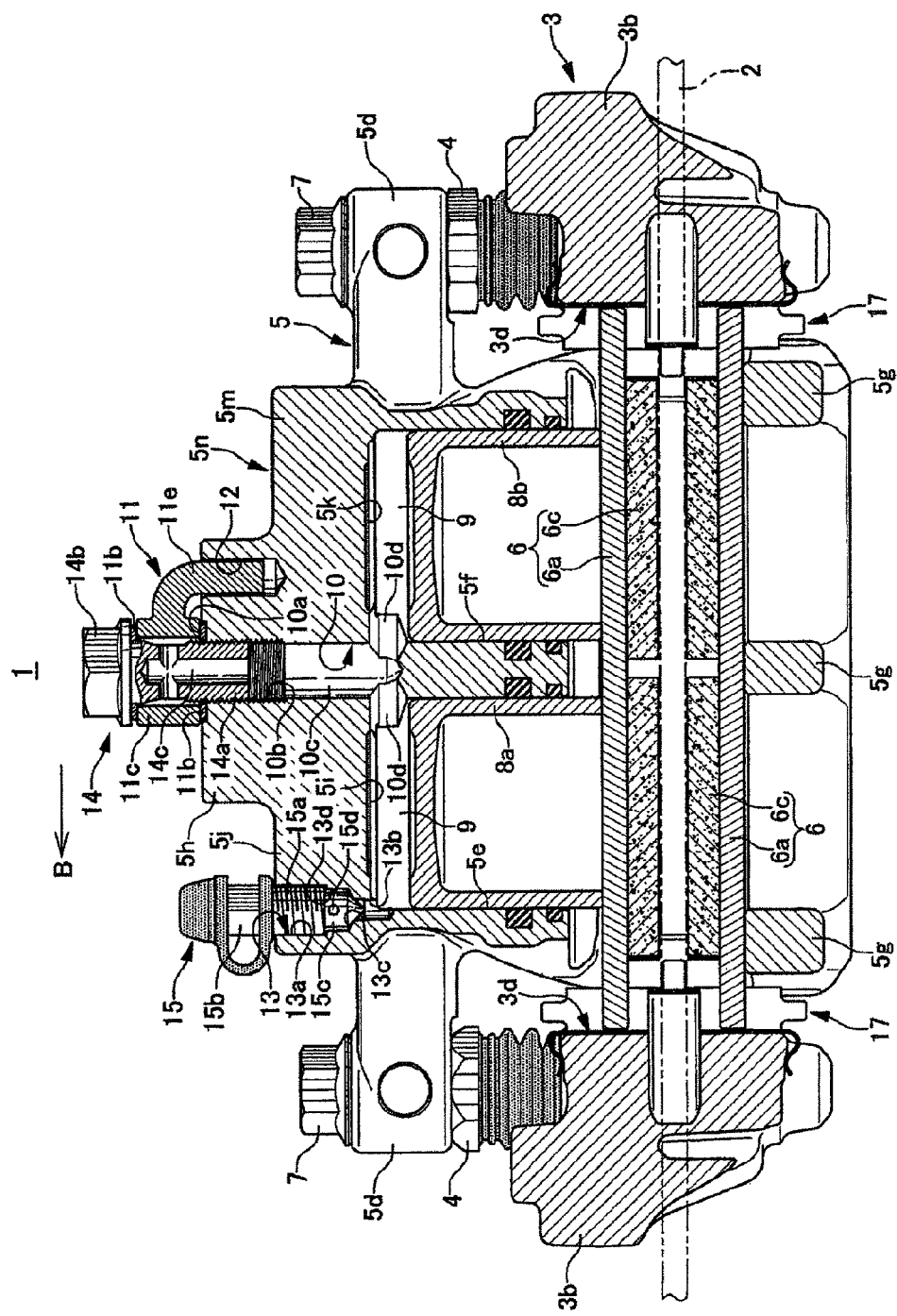
FIG. 2 is a sectional view taken along a line II-II in FIG. 1.
Figure 3:
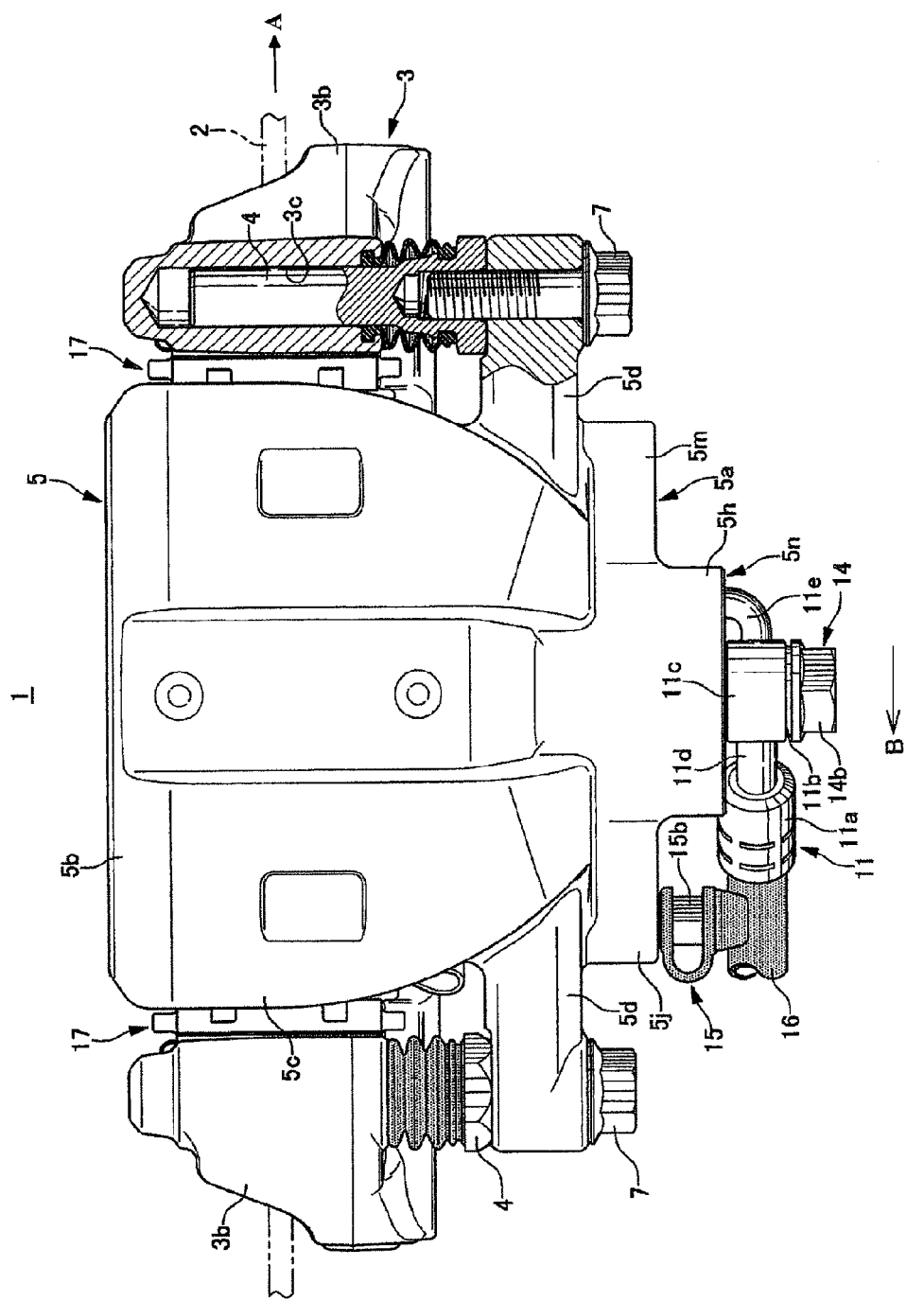
FIG. 3 is a plan view of the vehicle disc brake showing the embodiment.
Figure 4:
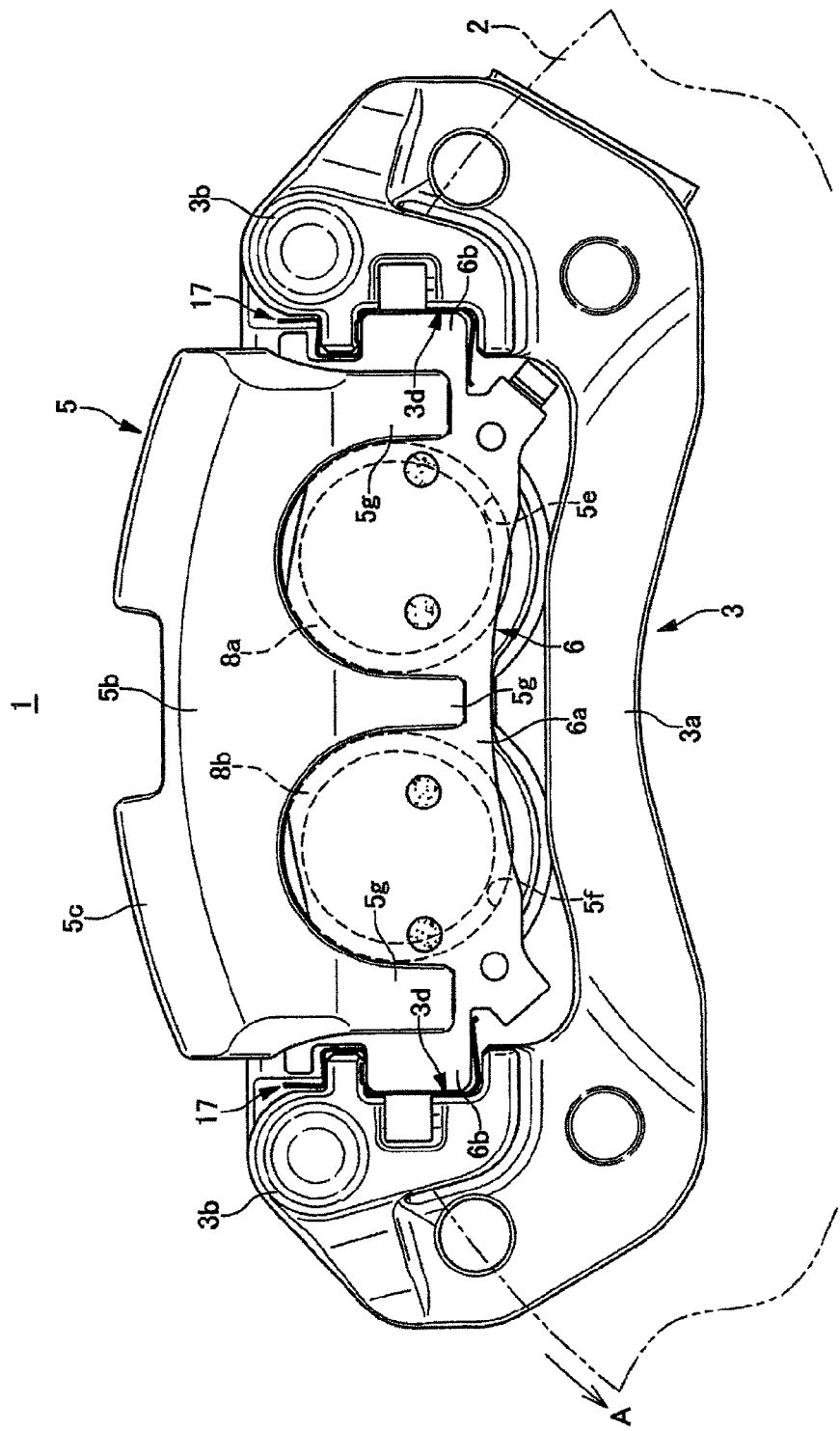
FIG. 4 is a rear view of the same vehicle disc brake.
Figure 5:
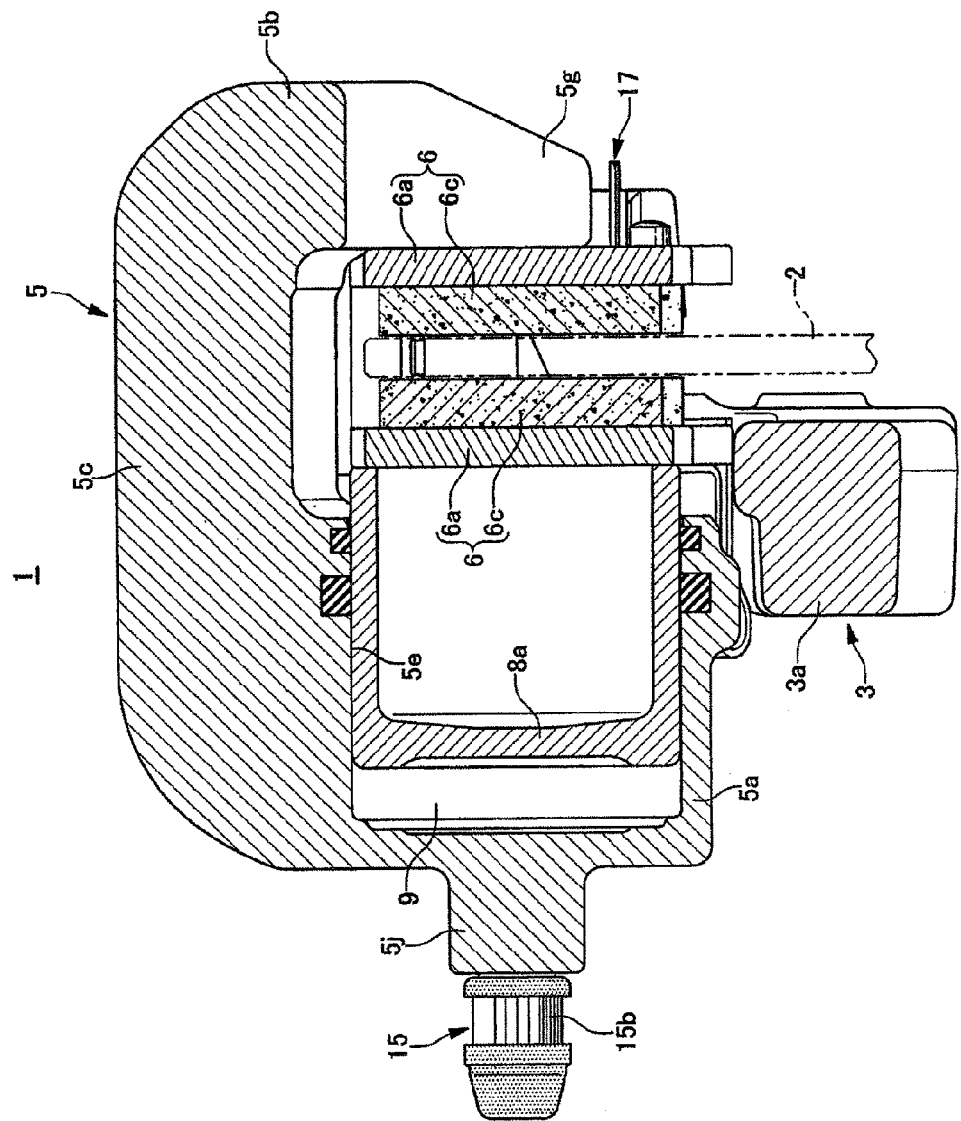
FIG. 5 is a sectional view taken along a line V-V in FIG. 1.

FIGS. 1 to 5 are views showing an embodiment. In the figures, an arrow A denotes a rotating direction of a disc brake rotor which rotates together with a wheel when the vehicle travels forwards, and when referred to in the following description, a rotating rotor exit side and a rotating rotor entrance side are those which result when the vehicle travels forwards. An arrow B denotes an upward direction of a vehicle body when the vehicle disc brake is mounted on the vehicle body.

A vehicle disc brake 1 according to this embodiment is a disc brake for a motor vehicle and includes a disc brake rotor 2 which rotates together with a wheel, not shown, a caliper bracket 3 which is secured to a vehicle body on one side portion of the disc brake rotor 2, a pin-sliding caliper body 5 which is supported on the caliper bracket 3 via a pair of slide pins 4, 4 so as to move in an axial direction of the disc brake rotor 2, and a pair of friction pads 6, 6 which are disposed to face both side portions of the disc brake rotor 2.

The caliper bracket 3 includes a plate-shaped portion 3a which is provided along the one side portion of the disc brake rotor 2 and a pair of pad support arms 3b, 3b.

The pad support arms 3b, 3b project from both end portions of the caliper bracket 3, stretch over an outer edge of the disc brake rotor 2 in the axial direction of the disc brake rotor 2 while holding both ends of a bridge portion 5c of the caliper body 5 therebetween, and project further towards the other side portion of the disc brake rotor 2.

A guide hole 3c which accommodates the slide pin 4 is formed in each pad support arm 3b, and four pad guide portions 3d having a U-shaped section are provided on both the pad support arms 3b in such a way that the two pad guide portions 3d face each other on each side portion of the disc brake rotor 2.

The caliper body 5 is fabricated through, for example, casting such as gravity casting and is mounted on a right-hand side of the vehicle body via the caliper bracket 3 with a rotating rotor entrance side directed upwards and a rotating rotor exit side directed downwards.

The caliper body 5 includes an acting portion 5a which is provided on the one side portion of the disc brake rotor 2, a reacting portion 5b which is disposed on the other side portion of the disc brake rotor 2 and the bridge portion 5c which stretches over an radially outer side of the disc brake rotor 2 to connect the acting portion 5a and the reacting portion 5b together.

Mounting arms 5d, 5d are provided at a rotating rotor entrance side and a rotating rotor exit side of the acting portion 5a so as to project therefrom. The slide pin 4 is mounted at a distal end of each mounting arm 5d with a mounting bolt 7. Then, the slide pins 4 are inserted individually into the corresponding guide holes 3c in the pad support arms 3b, whereby the caliper body 5 is supported by the caliper bracket 3 so as to move in the axial direction of the disc brake rotor 2.

Cylinder bores 5e, 5f are provided side by side in a circumferential direction of the disc brake rotor 2 in the acting portion 5a, and these cylinder bores 5e, 5f are opened at ends which face the disc brake rotor 2.

Three reacting claws 5g, 5g, 5g are provided on the reacting portion 5b. Glass-shaped pistons 8a, 8b are movably inserted into the corresponding cylinder bores 5e, 5f, and hydraulic chambers 9, 9 are defined between bottom portions of the cylinder bores 5e, 5f and the pistons 8a, 8b.

A union boss portion 5h is provided at a central portion, in relation to the circumferential direction of the disc brake rotor 2, of a side surface of the acting portion 5a which lies opposite to a side thereof which faces the disc brake rotor 2. In this embodiment, the union boss portion 5h is formed by making use of a gate portion which is formed by machining the portion which functioned as a gate in casting the caliper body 5 into a thick portion.

A first bleeder boss portion 5j is formed to extend from a portion lying further towards the rotating rotor entrance side than a bottom wall 5i of the rotating rotor entrance side cylinder bore 5e to the union boss portion 5h. In addition, a second bleeder boss portion 5m is formed to extend from a portion lying further towards the rotating rotor exit side than a bottom wall 5k of the rotating rotor exit side cylinder bore 5f to the union boss portion 5h The union boss portion 5h, the first bleeder boss portion 5j and the second bleeder boss portion 5m form a continuous projecting portion 5n in which the union boss portion 5h projects further outwards than the first bleeder boss portion 5j and the second bleeder boss portion 5m. The continuous projecting portion 5n is formed into a shape which is axisymmetric about a radial center line CL1 which passes a center of the caliper body 5 in a radial direction of the disc brake rotor 2.

A union hole 10 which communicates with the hydraulic chambers 9 and a locking hole 12 for a hose banjo 11 are formed in the union boss portion 5h, and a bleeder hole 13 is formed in the first bleeder boss portion 5j. A union bolt 14 is securely screwed into the union hole 10, and a bleeder screw 15 is securely screwed into the bleeder hole 13.

The union hole 10 is formed in a middle portion of the union boss portion 5h which lies between the cylinder bores 5e, 5f and on the radial center line CL1 which extends in the radial direction of the disc brake rotor 2. The union hole 10 has a seat surface 10a which is formed around an opening portion of the union boss portion 5h, an internally threaded hole 10b which continues from the seat surface 10a and which is securely screwed on an externally threaded portion 14a of the union bolt 14, a small-diameter hole 10c which continues to the internally threaded hole 10b, and communication holes 10d, 10d which respectively extend from the inner end portion of the small-diameter hole 10c toward each hydraulic chamber 9 and communicate with the corresponding hydraulic chambers 9.

The bleeder hole 13 is formed at a rotating rotor entrance side of the first bleeder boss portion 5j and is opened to the first bleeder boss portion 5j. The bleeder hole 13 has an internally threaded hole 13a which is securely screwed on an externally threaded portion 15a of the bleeder screw 15, a small-diameter hole 13b which is opened to the rotating rotor entrance side hydraulic chamber 9, and an intermediate-diameter hole 13d which includes a tapered seal portion 13c which connects the internally threaded hole 13a with the small-diameter hole 13b.

The union bolt 14 includes an externally threaded portion 14a and a hexagonal head portion 14b. A fluid passage hole 14c is formed in an interior of the externally threaded portion 14a, and a hydraulic piping 16 is connected to the union hole 10 via the union bolt 14.

The hydraulic piping 16 is connected to a known master cylinder at a proximal end portion, and the hose banjo 11 is securely fixed to a distal end portion of the hydraulic piping 16. This hose banjo 11 includes a connecting tube 11a which is crimp fixed to the other end portion of the hydraulic piping 16, a ring member 11c which is held by two washers 11b, 11b on both side surfaces thereof and which is fixed to the union hole 10 by the union bolt 14, a neck portion 11d which connects the connecting tube 11a to the ring member 11c and an L-shaped locking member 11e which projects from a circumferential was of the ring member 11c.

The hydraulic piping 16 is connected to the union hole 10 by inserting the ring member 11c of the hose banjo 11 into a proximal portion of the externally threaded portion 14a of the union bolt 14 via one of the washers 11b and screwing a distal end portion of the externally threaded portion 14a into the internally threaded hole 10b via the other washer 11b. A distal end of the locking member 11e is inserted into the locking hole 12, whereby the ring member 11c is prevented from rotating.

The bleeder screw 15 includes an externally threaded portion 15a, an exhaust tube 15b which projects from one end of the externally threaded portion 15a and a small-diameter shank portion 15c which projects from the other end of the externally threaded portion 15a. A through hole 15d is formed in an interior of the bleeder screw 15, and this through hole 15d is opened to an end face of the exhaust tube 15b and an outer circumferential surface of the small-diameter shank portion 15c. A distal end portion of the small-diameter shank portion 15c has a conical shape. This bleeder screw 15 is installed in the bleeder hole 13 by securely screwing the externally threaded portion 15a into the internally threaded hole 13a Normally, the distal end portion of the small-diameter shank portion 15c is brought into press contact with the seal portion 13c for metal sealing, whereby a communication between the internally threaded hole 13a and the small-diameter hole 13b is shut off to thereby seal up the hydraulic chambers 9, 9 in a fluid-tight fashion.

Lug pieces 6b, 6b are provided at end portions of a shoe or a backing plate 6a of each friction pad 6 so as to project therefrom. A lining 6c is affixed to one side surface of the backing plate 6a. The lug pieces 6b are inserted into the corresponding pad guide portions 3d, 3d via pad retainers 17 to thereby be supported so as to move in the axial direction of the disc brake rotor 2.

The caliper body 5 which is configured in the way described above is mounted on the vehicle body via the caliper bracket 3 while straddling, for example, a disc brake rotor 2 of a right front or rear wheel of the vehicle in such a state that the bleeder hole 13 is positioned upwards. Hydraulic fluid which is pressurized in a hydraulic master cylinder, not shown, as a result of a braking operation being performed by the driver enters the ring member 11c of the hose banjo 11 from the hydraulic piping 16, passes from the fluid passage hole 14c in the union bolt 14 through the internally threaded hole 10b, the small-diameter hole 10c and the communication holes 10d, 10d of the union hole 10 and is then supplied to the individual hydraulic chambers 9, 9. The pistons 8a, 8b are caused to move forwards in the corresponding cylinder bores 5e, 5f by the supply of the hydraulic fluid to thereby press the friction pad 6 on the acting portion 5a side against one side surface of the disc brake rotor 2. Next, the caliper body 5 moved in the direction of the acting portion 5a while being guided by the slide pins 4, 4 by a reaction force produced by the press contact of the friction pad 6 against the disc brake rotor 2, whereby the reacting claws 5g, 5g, 5g which are provided on the reacting portion 5b press the friction pad 6 on the reacting portion 5b side against the other side surface of the disc brake rotor 2.

In bleeding air mixed in the hydraulic fluid within a brake system from the hydraulic master cylinder to the hydraulic chambers 9, 9, the bleeder screw 15 is turned in a direction in which it is loosened so that the distal end portion of the small-diameter shank portion 15c is separated from the seal portion 13c of the bleeder hole 13, whereby the small-diameter hole 13b of the bleeder hole 13 communicates with the through hole 15d of the bleeder screw 15, this enabling the hydraulic fluid in the hydraulic chambers 9, 9 and air mixed in the hydraulic fluid to be discharged to an exterior of the caliper body 5.

In mounting the caliper body 5 on the caliper bracket 3 in such a state that the rotating rotor exit side is directed upwards and the rotating rotor entrance side is directed downwards or applying the caliper body 5 to a disc brake which is mounted on a left-hand side of the vehicle body, the bleeder hole 13 is formed in the second bleeder boss portion 5m so that the bleeder hole 13 is disposed upwards when the caliper body 5 is so mounted on the vehicle body.

According to the embodiment, as described above, the first bleeder boss portion 5j is formed to extend from an outer side of a rotating rotor entrance side end portion of the rotating rotor entrance side cylinder bore 5e to the union boss portion 5h. Therefore, in changing the diameter of the cylinder bore 5e, the bleeder bore 13 can be formed in an optimum position according to the changed diameter of the cylinder bore 5e. Thus, a caliper body 5 having cylinder bores 5e, 5f of a different diameter can be formed by using the existing molded piece for the caliper body 5. This can impart the versatility to molded pieces prepared for the caliper body 5, thereby reducing production costs.

The first bleeder boss portion 5j and the second bleeder boss portion 5m are provided at the circumferential end portions of the union boss portion 5h. This enables the fabrication of a caliper body 5 which is mounted on the right-hand side of the vehicle body and a caliper body 5 which is mounted on the left-hand side of the vehicle body by using molded pieces of one type which are prepared for the right or left caliper body 5 by changing the position where the bleeder hole 13 is formed, thereby reducing production costs.

The union boss portion 5h, the first bleeder boss portion 5j and the second bleeder boss portion 5m form the continuous projecting portion 5n in which the union boss portion 5h projects further outwards than the first bleeder boss portion 5m and the second bleeder boss portion. This avoids the interference of the hydraulic tube 16 which is connected the union hole 10 with the bleeder screw 15 which is installed in the bleeder hole 13, thereby enhancing the degree of freedom in layout.

The union boss portion is formed by making use of the gate portion used in casting the molded piece, whereby the caliper body is formed into the simple shape, and the union hole becomes easy to be formed, thereby reducing projection costs.

The invention is not limited to the embodiment described above. The invention is not limited to the configuration in which the bleeder boss portions are provided at the circumferential end portions of the union boss portion, and hence, one bleeder boss portion may be formed on either of the circumferential end portions of the union boss portion.

The invention is not limited to the configuration in which the union boss portion is formed by making use of the gate portion, and can also be applied to a caliper body including one cylinder bore or a caliper body including three or more cylinder bores, as well as an opposed piston caliper body of which acting portion is provided on the both end portions of the disc rotor.

The caliper body is not limited to the one which is fabricated by working the molded piece formed through gravity casting, and hence, the caliper body may be fabricated by using a molded piece which is formed through forging.

The invention claimed is:

1. A vehicle disc brake caliper body comprising:
   an acting portion having a cylinder bore into which a piston is inserted;
   a union boss portion having a union hole through which a pressurized hydraulic fluid is introduced into a hydraulic chamber provided between a bottom wall of the cylinder bore and the piston; and
   a bleeder boss portion having a bleeder hole through which air mixed in the hydraulic fluid is discharged,
   wherein the union boss portion is formed at a central portion of a side surface of the acting portion in a circumferential direction of a disc brake rotor, the side surface being opposite to a side surface facing the disc brake rotor,
   wherein the bleeder boss portion extends from an outer circumferential side of the bottom wall of the cylinder bore to the union boss portion, and
   wherein the union boss portion and the bleeder boss portion form a continuous projecting portion such that the union boss portion projects further outwards in an axis direction of the cylinder bore than the bleeder boss portion and both the union boss portion and the bleeder boss portion extend outwards from the same side surface.

2. The vehicle disc brake caliper body of claim 1,
   wherein the bleeder boss portion comprises two bleeder boss portions which are provided individually at both end portions of the union boss portion in the circumferential direction of the disc brake rotor.

3. The vehicle disc brake caliper body of claim 1,
   wherein the caliper body is fabricated by working a molded piece.

4. The vehicle disc brake caliper body of claim 3,
   wherein the molded piece is formed through casting.

5. The vehicle disc brake caliper body of claim 4,
   wherein the union boss portion is formed by working a gate portion used in casting the molded piece.

6. The vehicle disc brake caliper body of claim 1, further comprising a second cylinder bore, wherein the central portion of the side surface of the acting portion is provided at a location between the cylinder bore and the second cylinder bore.

7. The vehicle disc brake caliper body of claim 6,
   wherein the cylinder bore and the second cylinder bore are provided side by side in the circumferential direction of the disc brake rotor in the acting portion.

8. The vehicle disc brake caliper body of claim 7,
   wherein the union boss portion is a machined gate portion of a cast.

9. The vehicle disc brake caliper body of claim 8, further comprising a second bleeder boss portion extending from a portion lying further towards a rotating rotor exit side than a bottom wall of a rotating rotor exit side of the second cylinder bore to the union boss portion,
   wherein the bleeder boss portion extends from a portion lying further towards a rotating rotor entrance side than a bottom wall of a rotating rotor entrance side of the cylinder bore to the union boss portion.

10. The vehicle disc brake caliper body of claim 9,
    wherein the union boss portion, the first bleeder boss portion and the second bleeder boss portion form the continuous projecting portion.

11. The vehicle disc brake caliper body of claim 10,
    wherein the union boss portion projects further outwards than the first bleeder boss portion and the second bleeder boss portion.

12. The vehicle disc brake caliper body of claim 11,
    wherein the continuous projecting portion is axisymmetric about a radial center line which passes a center of the caliper body in a radial direction of the disc brake rotor.

13. The vehicle disc brake caliper body of claim 12,
    wherein the union hole is formed in a middle portion of the union boss portion which lies between the cylinder bore and the second cylinder bore on the radial center line which extends in the radial direction of the disc brake rotor.

14. The vehicle disc brake caliper body of claim 12,
    wherein the union hole has a seat surface which is formed around an opening portion of the union boss portion, an internally threaded hole which continues from the seat surface and which is connected on an external portion of the union bolt, a hole which continues to the internally threaded hole, and communication holes which respectively extend from an inner end portion of the hole toward each hydraulic chamber of the cylinder bore and the second cylinder bore.

15. The vehicle disc brake caliper body of claim 1,
    wherein the bleeder hole is formed at a rotating rotor entrance side of the bleeder boss portion and is opened to the bleeder boss portion.

16. The vehicle disc brake caliper body of claim 15,
    wherein the bleeder hole has an internally threaded hole which is screwed on an externally threaded portion of a bleeder screw, a small-diameter hole which is opened to the rotating rotor entrance side of the cylinder bore, and an intermediate-diameter hole which includes a tapered seal portion which connects the internally threaded hole with the small-diameter hole.

17. The vehicle disc brake caliper body of claim 12, further comprising a hose banjo connected to a union bolt in the union hole and a locking hole in the continuous projecting portion.

18. The vehicle disc brake caliper body of claim 17,
    wherein the first bleeder boss portion and the second bleeder boss portion are provided at circumferential end portions of the union boss portion.

19. The vehicle disc brake caliper body of claim 18,
    wherein the union boss portion, the first bleeder boss portion and the second bleeder boss portion form the continuous projecting portion in which the union boss portion projects further outwards than the first bleeder boss portion and the second bleeder boss portion.

20. The vehicle disc brake caliper body of claim 1,
    wherein the continuous projecting portion is formed into a shape which is axisymmetric about a radial center line which passes a center of the caliper body in the radial direction of the disc brake rotor.

* * * * *